MODULARLY EXPANDABLE ELECTRONIC ENCLOSURE DEFINING A COMMON INTERCONNECTING PASSAGEWAY

Filed Feb. 21, 1964

INVENTORS
CHARLES E. BOZARTH -
DAVID L. BARNETT - AND -
WILLIAM H. REED
BY
Warren F. B. Lindsley
ATTORNEY United States Patent Office 3,281,194

Patented Oct. 25, 1966

3,281,194

MODULARLY EXPANDABLE ELECTRONIC ENCLOSURE DEFINING A COMMON INTERCONNECTING PASSAGEWAY

Charles E. Bozarth, David L. Barnett, and William H. Reed, Phoenix, Ariz., assignors to General Electric Company, a corporation of New York Filed Feb. 21, 1964, Ser. No. 346,568
1 Claim. (Cl. 312—199)

This invention relates to housing for electrical components and more particularly to a new and improved modularly expandable electronic enclosure for computer structures forming a part of an electronic data processing system.

The first generation of computers employing an amalgamation of known thermionic type electronic circuits and mechanical processing techniques were packaged in a hodge-podge manner in a plurality of boxes interconnected by masses of lengthy conductors. Since the operating temperature of these electronic components is critical, most of the boxes required refrigerated air in forced convection to remove heat.

The second generation of computers employed solid state circuitry, transistors and minute magnetic cores in the arithmetic units. This type of component and circuitry consumed far less power and generated far less heat than the thermionic tubes of the first generation of computers, thereby greatly reducing the air conditioning requirements of the system. Programming techniques also were refined and certain programming functions were built into the computer to short circuit lengthy programming procedures. The cabinet housing the computer and its associated data processing system was scaled down in size to fit the smaller components and arranged around a control console with most of the wiring interconnecting the various cabinets concealed in the floor or ceiling of the room. In spite of the increased speed of operation of the solid state circuitry in the second generation of computers over thermionic type electronic circuits of the first generation, it soon became evident that the second generation computer and its associated data processing system was too slow to handle the large masses of data confronting it and would have to be speeded up.

The third generation of computers was then conceived employing technical innovations in the circuitry to speed up the operation of the circuits and in turn, the speed of operation of the electronic data processing system. The increased speed of operation of the circuitry, however, required shorter electrical cable connections between the various operating components of the computer and its associated peripheral equipment than provided by the second generation of computers. In addition to the need of a more compact arrangement of the parts of the computer, the various electrical components of the system had to be rendered constantly accessible for maintenance and servicing. Further, the computer structure had to be expandable to meet the needs of the future without redesigning the whole computer housing. Therefore, a need exists for a small compact unitary cabinet structure which will house all of the various components of the computer in modules readily accessible at all times.

In accordance with the invention claimed, a new and improved modularly expandable electronic computer enclosure is provided which comprises a plurality of cabinets arranged so that an end of one of the cabinets is positioned in spaced arrangement with an end of each of the other cabinets. The ends of the cabinets are fastened together by suitable means such as a pair of vertically spaced support members, one arranged at the top and one arranged at the bottom of the cabinets to form a unitary cabinet structure. The ends of the cabinets define between the support members a vertically arranged passageway for conductors connecting components arranged within the cabinets. At least a part of one of the cabinets may be hinged to the support members for providing pivoted movement of this part of the cabinet relative to the remainder of the cabinet for providing access to the electronic components in the cabinet.

It is, therefore, one object of this invention to provide a new and improved modularly expandable electronic enclosure.

Another object of this invention is to provide a new and improved modularly expandable computer structure in which a plurality of cabinets are arranged in a predetermined configuration to provide the shortest possible conductor path between any two of the cabinets.

A further object of this invention is to provide a new and improved electronic enclosure formed from a plurality of similarly shaped cabinets in which an end of each of the cabinets cooperate to form a passageway for conductors which electrically interconnect components in the cabinets.

Other objects and advantages of this invention will become apparent from the following description when taken in connection with the accompanying drawing in which.

Figures 1, 2:
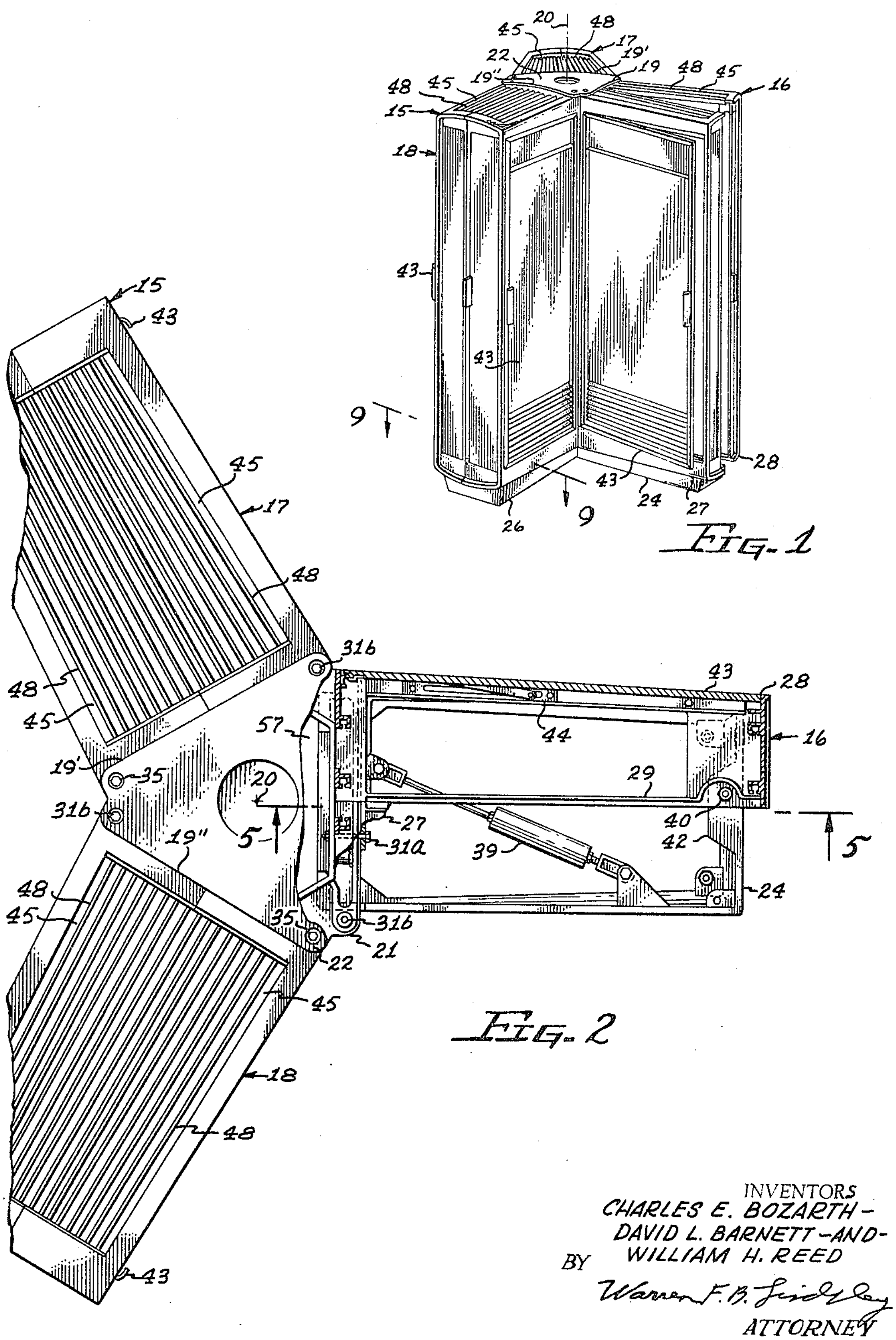
FIG. 1 is a perspective view of a modularly expandable electronic enclosure embodying the invention and showing a door and one section of a cabinet open.
FIG. 2 is a plan view partly in cross section of the structure shown in FIG. 1.

Referring more particularly to the drawings by characters of reference, FIGS. 1 and 2 disclose a modularly expandable electronic enclosure for a computer. Enclosure 15 comprises a plurality of cabinets 16, 17 and 18 which are so arranged in a wing shaped configuration that an end of one of the cabinets is positioned in spaced arrangement with an end of each of the other cabinets, i.e., ends 19, 19′, 19″ of cabinets 16, 17, 18, respectively, are closely spaced to each other. The end-to-end arrangement of the cabinets shown in FIGS. 1 and 2 may be positioned in a configuration such that vertical planes through the center of each cabinet intersect along a common line 20. Line 20 is shown as being spaced an equal distance from the adjacent end surfaces of each of the cabinets. Although the portions of the cabinets facing each other in the geometrical arrangements shown have been described and claimed as being end surfaces of the cabinets, it is to be understood that these surfaces may also be described as being faces of the cabinets.

Figures 3, 4:
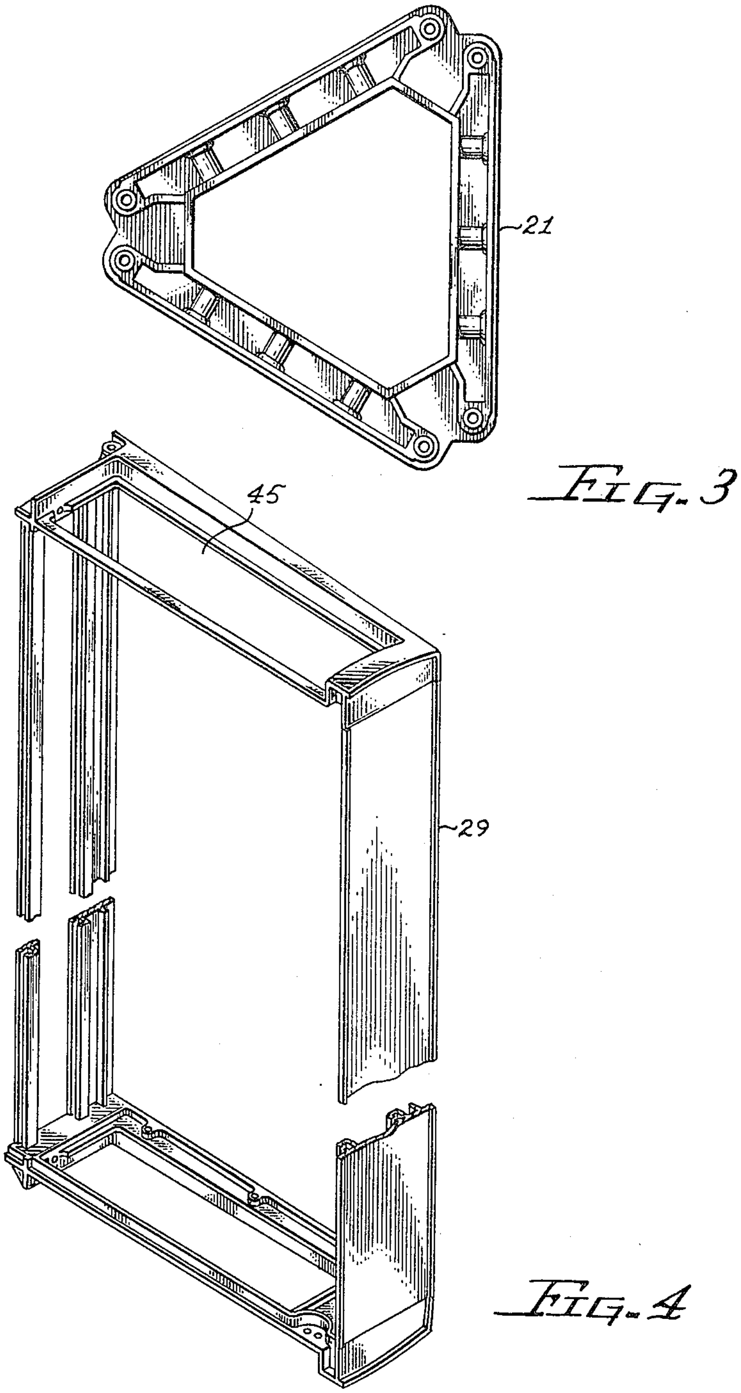
FIG. 3 is a plan view of the base and top cabinet supporting member shown in FIGS. 1 and 2.
FIG. 4 is a perspective view of the framework of one section of a cabinet.

The cabinets are held together in a given configuration by a pair of horizontally arranged, vertically spaced load bearing support members 21 and 22, one of which is shown in FIG. 3. These support members are aligned and positioned such that a common axis between them which is arranged transversely to their horizontal surfaces is also coaxially arranged with line 20, formed by the intersection of the vertical planes passing through the center of cabinets 16, 17 and 18. Each of the cabinets is fastened to support members 21 and 22 by bolts, some of which form hinge connections as hereinafter explained. These support members may be identical castings arranged with common sides facing each other. Support member 21, forming the base supporting structure of the enclosure, has fastened to it in any suitable manner, such as by welding, a plurality of base supporting weldments, one for each of the cabinets 16, 17 and 18. Weldments 24 and 26 for cabinets 16 and 18 are shown in FIG. 1. The weldments and platelike load supporting members 21 and 22, together with the frame of the cabinets, form the frame for the enclosure and provide rigidity for the unitary cabinet structure.

Each of the cabinets shown comprises a pair of mating sections, such as sections 27 and 28 of cabinet 16, which cooperate to form one wing of the enclosure. Since the cabinets are shown as being identical structures, only one will be described in detail. Either or both of sections 27 and 28 may be mounted so as to be movable one relative to the other. However, as shown in FIGS. 1, 2 and 5, only one-half of the cabinet is movable relative to the other half, i.e., section 28 moves relative to section 27. Each section of a cabinet of enclosure 15 is identical to its mating section and as shown in FIG. 4, comprises a frame 29 having a substantially parallelepiped on configuration. Frame 29 of section 27 is bolted to support members 21 and 22 by bolts **31*a* and 31*b* shown in FIG. 2, and by a pair of bolts similarly arranged as bolts 32 shown in the cross sectional view of cabinet 18 in FIG. 10. Bolt 31*a* is used to provide angular adjustment of the fixed section 27 relative to the movable section 28. Section 28 is pivotally mounted on support members 21 and 22 for movement relative to section 27. The hinge connections 33 and 34 are each formed, as shown in FIG. 6, by bolt 35 threadedly connected to frame 29 of section 28 and pivotally mounted in a suitable bushing 36 mounted in apertures 37 formed in support member 21**.

In order to control the movement of section 28 relative to section 27 and weldment 24, a known shock absorber 39 is connected between these sections in the manner shown in FIG. 2. Section 28 is held in its closed position by an adjustable spring loaded ball plunger 40. The ball end, as shown in FIG. 5, engages a hard resilient pad 41 mounted in cooperating arrangement on a flange 42 forming a part of weldment 24.

As shown in FIGS. 1 and 2, each of the sections of each of the cabinets is provided with a door 43 on its exposed side which provides access to the interior of that section of the cabinet. Each door is pivotally mounted adjacent the core of the wing shaped configuration of enclosure 15 and is controlled during its closing movement by door stop 44 shown in FIGS. 5 and 7.

Figures 5, 6, 7, 8:
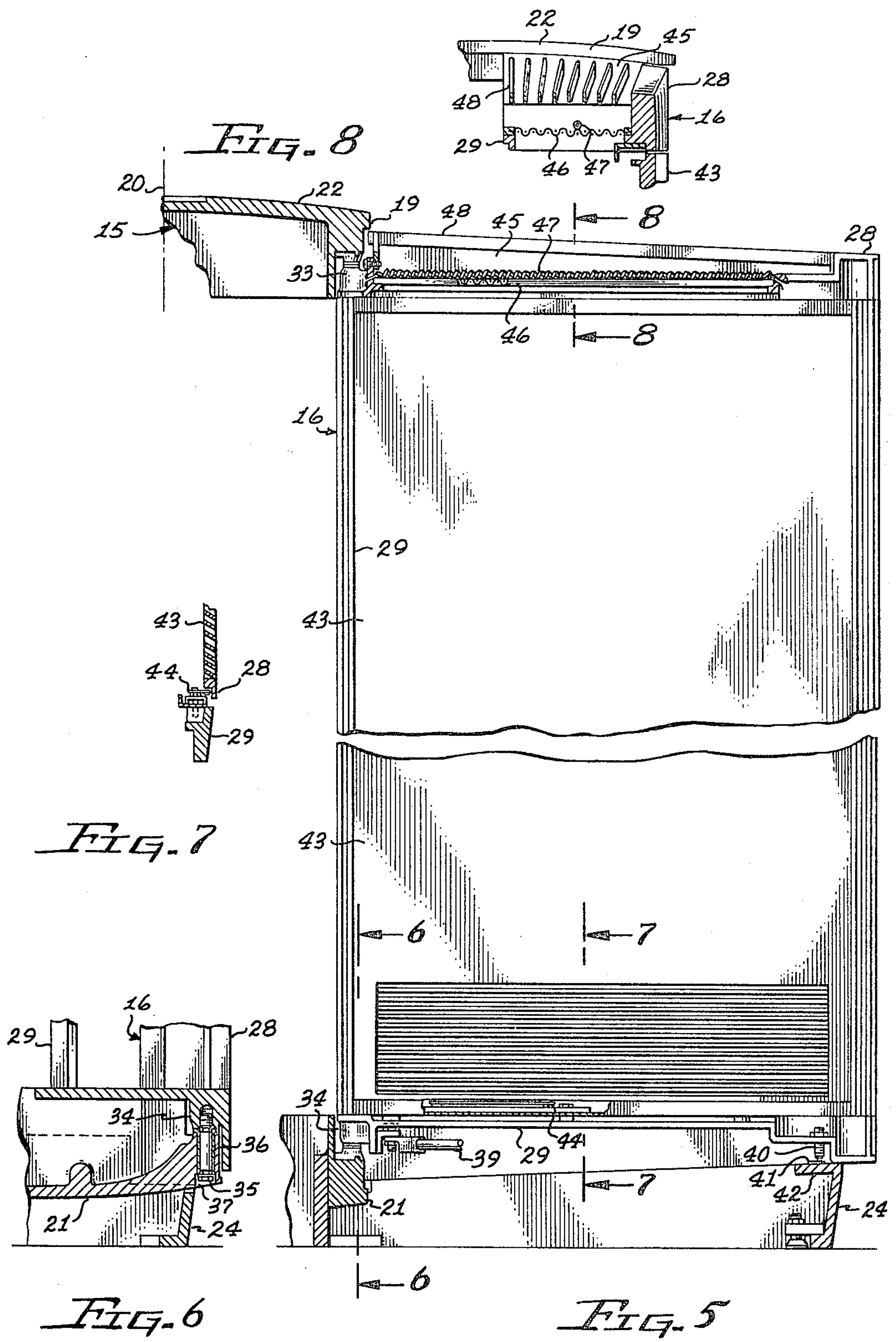
FIG. 5 is a cross sectional view of the structure shown in FIG. 2 taken along the line 5—5.
FIG. 6 is a cross sectional view of the structure shown in FIG. 5 taken along the line 6—6 showing the hinge mechanism.
FIG. 7 is a cross sectional view of the structure shown in FIG. 5 taken along the line 7—7 showing the door stop.
FIG. 8 is a cross sectional view of the structure shown in FIG. 5 taken along the line 8—8 showing the air inlet and filter configuration.
Figures 9, 10:
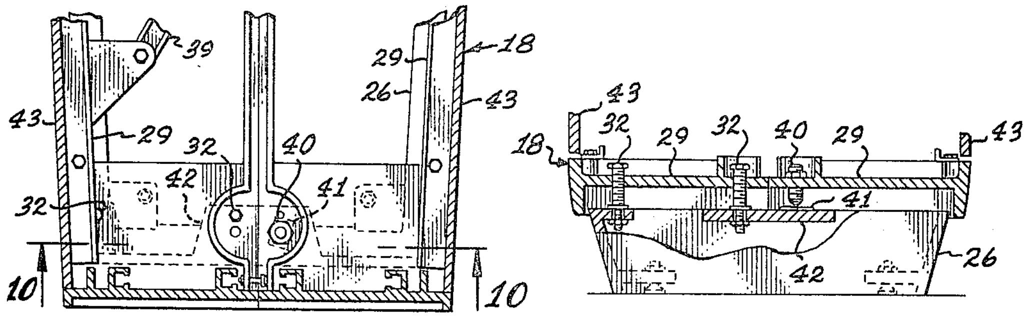
FIG. 9 is a cross sectional view of the structure shown in FIG. 1 taken along the line 9—9 showing the fixed and movable portion of one cabinet construction.
FIG. 10 is a cross sectional view of the structure shown in FIG. 9 taken along the line 10—10 showing more detail of the fixed and movable portions of one cabinet structure.

The opening 45 in the top of each section of each of the cabinets, shown in FIGS. 5 and 8, is covered by a suitable air filter 46 which is arranged within the outline of the cabinet. A tension spring 47, arranged to extend across opening 45 and the top of filter 46, reduces or eliminates vibration of the filter structure. The symmetry of the outline of the cabinet is completed by a grill 48 mounted across the top of the sections of each of the cabinets.

Figures 11, 12:
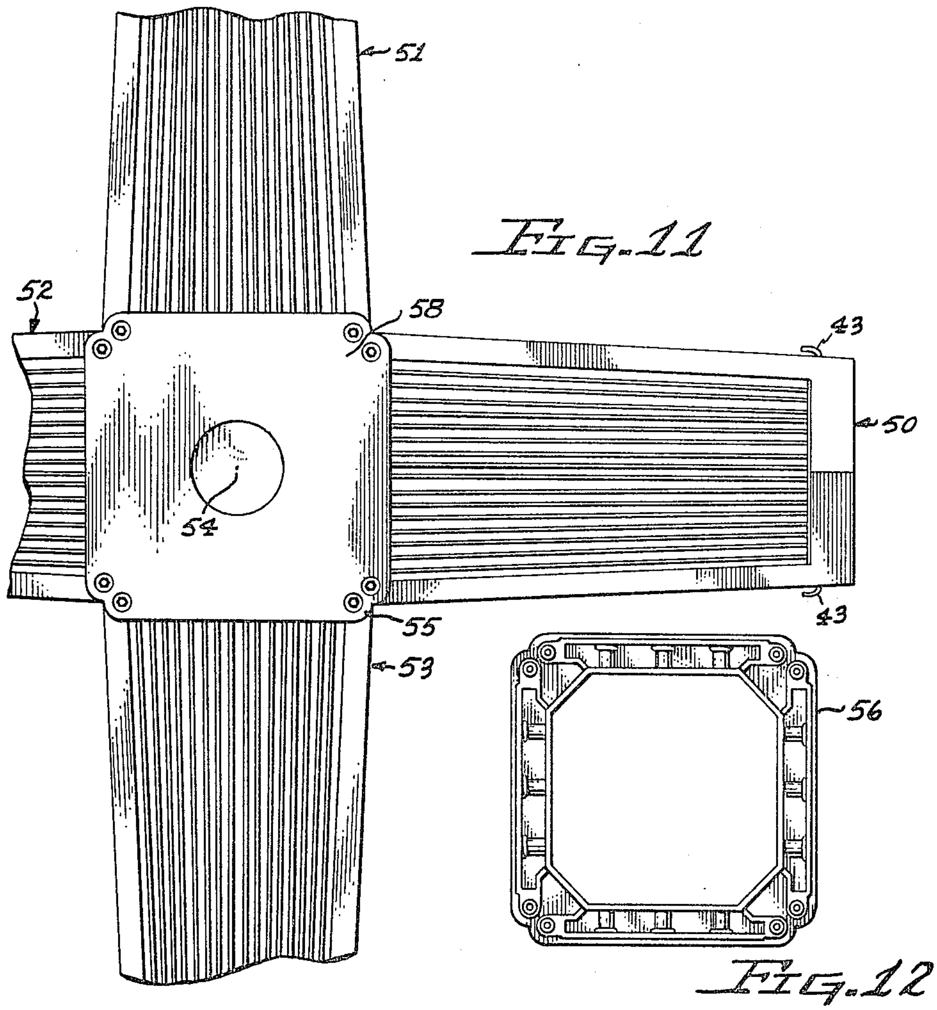
FIG. 11 is a plan view of a structure similar to the one shown in FIG. 1 showing a four wing cabinet configuration.
FIG. 12 is a plan view of the base and top cabinet supporting members of FIG. 11.

FIG. 11 illustrates a structure similar to the one shown in FIGS. 1–10 and comprises a plurality of cabinets 50, 51, 52 and 53 arranged in a wing shaped configuration so that an end of one of the cabinets is positioned in spaced arrangement with an end of each of the other cabinets. The end-to-end arrangement of the cabinets is positioned such that vertical planes through the center of each cabinet intersect along a vertical line 54. Line 54 is spaced equally from all of the adjacent end surfaces of each of the cabinets. Each of the cabinets are fastened to support members 55 and 56, shown in FIGS. 11 and 12, by bolts and hinges in the same manner as explained for the structure shown in FIGS. 1–10. These support members may be identical castings arranged with common sides facing each other. As in FIGS. 1–10, the support member 56, forming the base supporting structure of the enclosure, has fastened to it a plurality of base supporting weldments (not shown but identical to those shown and described for FIG. 1), one for each of the cabinets 50, 51, 52 and 53. The weldments and support members, together with the frame of the cabinets, form the frame for the enclosure.

In accordance with the invention claimed, the cabinets forming the structures shown in FIGS. 1 and 11 define between their adjacent ends and their support members 21, 22 and 55, 56, respectively, vertically arranged passageways or chambers 57 and 58. These chambers provide the passageways or channels for means such as conductors for connecting the components in any two or more of the cabinets together. Since this new and improved arrangement provides the shortest possible conductor length between a plurality of cabinets in the enclosure, it aids in reducing the time of operation of the electrical system housed in the enclosure. Further, the new arrangement provides a way of adding modules to the system by merely changing the shape of the outer periphery of the support members. All of the other parts of the enclosure may remain the same. Thus, a three wing cabinet arrangement may be readily changed to a four wing configuration without changing the configuration of the various cabinets or their bolt and hinge arrangements by merely changing the support members 21 and 22 for two of the types shown in FIG. 12. This feature makes it possible to easily change and update an existing installation.

Although only three and four wing cabinet configurations have been shown, it is intended to be within the scope of this invention to cover any number of wing or cabinet arrangements formed by the end-to-end configuration claimed. Further, it is intended that the end-to-end language in the claims be broad enough to include any surface of the cabinets positioned in that position to form a wall of the chamber.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claim is therefore intended to cover and embrace any such modifications, within the limits only of the true spirit and scope of the invention.

What is claimed is:

An enclosure comprising a pair of vertically spaced support members, a plurality of cabinets arranged in an end-to-end configuration between said support members such that vertical planes passing through the center of each cabinet intersect along a common line spaced equally from each of the cabinets, means for connecting the juxtapositioned ends of the cabinets to the support members to form a unitary structure, said juxtapositioned ends of the cabinets defining between them a vertically arranged chamber the vertical axis of which is coaxially arranged with said common line, each of said juxtapositioned ends comprising a substantially vertically arranged wall, said wall being provided with an opening extending along the length thereof, said opening and said chamber forming a passageway for conductors which electrically connect components of the cabinets, at least half of one of the cabinets being hinged to said members for providing pivotal movement of said half of the one cabinet relative to its remainder.

References Cited by the Examiner

UNITED STATES PATENTS

| | | | |
|---|---|---|---|
| 1,176,231 | 3/1916 | Magin | 312—213 |
| 1,186,964 | 6/1916 | Armstrong | 312—198 X |
| 1,544,117 | 6/1925 | Wyatt | 6—66 |
| 1,875,383 | 9/1932 | La Porte | 312—199 |
| 3,192,306 | 6/1965 | Skonnord | 312—213 X |

FOREIGN PATENTS

| | | |
|---|---|---|
| 615,245 | 1/1961 | Italy. |

CLAUDE A. LE ROY, *Primary Examiner.*

CHANCELLOR E. HARRIS, *Examiner.*